(12) United States Patent
Reijonen

(10) Patent No.: US 9,791,592 B2
(45) Date of Patent: Oct. 17, 2017

(54) RADIATION GENERATOR WITH FRUSTOCONICAL ELECTRODE CONFIGURATION

(71) Applicant: Schlumberger Technology Corporation, Sugar Land, TX (US)

(72) Inventor: Jani Reijonen, Princeton, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 183 days.

(21) Appl. No.: 14/539,685

(22) Filed: Nov. 12, 2014

(65) Prior Publication Data

US 2016/0133428 A1     May 12, 2016

(51) Int. Cl.
| | | |
|---|---|---|
| *H01J 35/00* | (2006.01) | |
| *H01J 35/02* | (2006.01) | |
| *H01J 35/04* | (2006.01) | |
| *H01J 35/14* | (2006.01) | |
| *H01J 35/16* | (2006.01) | |
| *G01V 5/04* | (2006.01) | |
| *G01V 5/12* | (2006.01) | |
| *H01J 35/32* | (2006.01) | |

(52) U.S. Cl.
CPC ............. *G01V 5/04* (2013.01); *G01V 5/125* (2013.01); *H01J 35/00* (2013.01); *H01J 35/02* (2013.01); *H01J 35/025* (2013.01); *H01J 35/04* (2013.01); *H01J 35/045* (2013.01); *H01J 35/14* (2013.01); *H01J 35/16* (2013.01); *H01J 35/32* (2013.01)

(58) Field of Classification Search
CPC .......... H01J 35/00; H01J 35/02; H01J 35/025; H01J 35/04; H01J 35/045; H01J 35/14; H01J 35/16; G01V 5/04
USPC .................................................. 378/119, 120
See application file for complete search history.

(56) References Cited

U.S. PATENT DOCUMENTS

| | | | | |
|---|---|---|---|---|
| 2,994,775 A | * | 8/1961 | Mott ......................... | G01V 5/08 250/269.1 |
| 3,061,728 A | | 10/1962 | Arnold | |
| 3,151,243 A | * | 9/1964 | Mott ......................... | G01V 5/08 250/253 |
| 3,448,314 A | | 6/1969 | Bounden et al. | |
| 4,024,426 A | * | 5/1977 | Vaguine .................... | H05H 9/04 315/5.41 |
| 4,311,912 A | | 1/1982 | Givens | |
| 4,343,997 A | * | 8/1982 | Heinz ....................... | A61B 6/08 250/505.1 |

(Continued)

*Primary Examiner* — Allen C. Ho
(74) *Attorney, Agent, or Firm* — Michael Dae

(57) ABSTRACT

A radiation generator may include an elongate generator housing having a proximal end and a distal end, a target electrode within the elongate generator housing at the distal end thereof, a charged particle source within the elongate generator housing at the proximal end thereof to direct charged particles at the target electrode. A plurality of accelerator electrodes may be spaced apart within the elongate generator housing between the target electrode and the charged particle source to define a charged particle accelerator section. Each accelerator electrode may include an annular portion having a first opening therein, and a frustoconical portion having a base coupled to the first opening of the annular portion and having a second opening so that charged particles from the charged particle source pass through the first and second openings to reach the target electrode.

20 Claims, 7 Drawing Sheets

(56) References Cited

U.S. PATENT DOCUMENTS

| | | | | |
|---|---|---|---|---|
| 4,359,642 A * | 11/1982 | Heinz | G21K 1/02 | 250/505.1 |
| 4,431,979 A * | 2/1984 | Stijntjes | H01F 1/33 | 148/300 |
| 4,639,597 A * | 1/1987 | Shiokawa | H01J 37/252 | 250/305 |
| 4,758,722 A * | 7/1988 | Leckey | H01J 49/48 | 250/305 |
| 4,879,518 A * | 11/1989 | Broadhurst | H05H 5/04 | 313/360.1 |
| 5,326,970 A * | 7/1994 | Bayless | G01V 5/08 | 250/262 |
| 5,698,949 A * | 12/1997 | Lien | H01J 25/02 | 315/5.31 |
| 5,719,914 A * | 2/1998 | Rand | G01N 23/046 | 378/10 |
| 6,259,765 B1 | 7/2001 | Baptist | | |
| 6,316,876 B1 * | 11/2001 | Tanabe | H05H 7/18 | 315/5.39 |
| 6,366,641 B1 * | 4/2002 | Whitham | H05H 9/04 | 250/492.3 |
| 6,407,505 B1 * | 6/2002 | Bertsche | H05H 9/04 | 315/5.41 |
| 6,465,957 B1 * | 10/2002 | Whitham | H05H 9/04 | 315/5.41 |
| 6,493,424 B2 * | 12/2002 | Whitham | H05H 9/04 | 378/137 |
| 6,646,383 B2 * | 11/2003 | Bertsche | H05H 7/22 | 315/111.61 |
| 6,674,254 B2 * | 1/2004 | Hanna | H05H 7/18 | 250/492.3 |
| 6,954,515 B2 * | 10/2005 | Bjorkholm | G21K 1/093 | 378/113 |
| 6,977,987 B2 * | 12/2005 | Yamashita | A61N 5/10 | 378/64 |
| 7,005,809 B2 * | 2/2006 | Whitham | H05H 7/12 | 315/5.21 |
| 7,112,924 B2 * | 9/2006 | Hanna | H05H 7/18 | 315/5.41 |
| 7,162,005 B2 * | 1/2007 | Bjorkholm | G01V 5/0016 | 378/143 |
| 7,188,999 B2 * | 3/2007 | Mihara | A61N 5/10 | 378/17 |
| 7,208,890 B2 * | 4/2007 | Zavadtsev | H05H 7/00 | 315/5.41 |
| 7,239,095 B2 * | 7/2007 | Ho | H05H 9/04 | 315/5.41 |
| 7,239,684 B2 * | 7/2007 | Hara | A61N 5/1049 | 378/65 |
| 7,339,320 B1 * | 3/2008 | Meddaugh | H05H 9/048 | 315/5.41 |
| 7,423,381 B2 * | 9/2008 | Hanna | H05H 7/18 | 315/5.41 |
| 7,564,948 B2 | 7/2009 | Wraight et al. | | |
| 7,619,374 B2 * | 11/2009 | Aoi | A61N 5/10 | 315/39 |
| 7,668,293 B2 | 2/2010 | Wraight et al. | | |
| 7,817,781 B2 | 10/2010 | Wraight et al. | | |
| 7,960,687 B1 | 6/2011 | Simon et al. | | |
| 8,111,025 B2 * | 2/2012 | Whittum | H05H 9/04 | 315/5.39 |
| 8,203,289 B2 * | 6/2012 | Ho | H05H 9/04 | 315/505 |
| 8,284,898 B2 * | 10/2012 | Ho | H05H 7/12 | 315/505 |
| 8,311,187 B2 * | 11/2012 | Treas | H05H 7/02 | 315/505 |
| 8,374,315 B2 * | 2/2013 | Freudenberger | H01J 35/06 | 378/134 |
| 8,760,050 B2 * | 6/2014 | Mohr | H05H 7/00 | 29/428 |
| 8,953,747 B2 * | 2/2015 | de Looz | H01J 35/14 | 313/402 |
| 9,257,253 B1 * | 2/2016 | Allen | H01J 29/04 | |
| 9,392,681 B2 * | 7/2016 | Botto | H05H 9/005 | |
| 2010/0195800 A1 | 8/2010 | Freudenberger | | |
| 2013/0259206 A1 | 10/2013 | de Looz et al. | | |
| 2016/0133432 A1 * | 5/2016 | Reijonen | H01J 35/14 | 250/269.1 |

* cited by examiner

RADIATION GENERATOR WITH FRUSTOCONICAL ELECTRODE CONFIGURATION

FIELD OF THE DISCLOSURE

This disclosure relates to charged particle accelerators and, more particularly, to electrode configurations for use in charged particle accelerators.

BACKGROUND

Due to some drawbacks of well logging instruments for hydrocarbon resource exploration utilizing gamma ray sources and gamma ray detectors, some well logging instruments instead utilize x-ray generators and x-ray detectors. As explained in U.S. Pat. No. 7,668,293 to Wraight et al., which is assigned to the same assignee as the present disclosure and is hereby incorporated herein in its entirety by reference, an x-ray generator may include an electron accelerator and a target. The electron accelerator accelerates electrons toward the target at a sufficient speed so that when the electrons are stopped by the target (which is sufficiently thick to stop electrons striking it), x-ray photons are produced, e.g., by Bremsstrahlung radiation.

Various advances in x-ray sources, x-ray detectors, and methods of analyzing the data generated thereby have been made, examples of which are set forth in U.S. Pat. No. 7,960,687 to Simon et al., U.S. Pat. No. 7,817,781 to Wraight et al., and U.S. Pat. No. 7,564,948 to Wraight et al., all of which are assigned to the same assignee as the present disclosure and are hereby incorporate herein in their entireties by reference. However, some particle accelerator configurations may have drawbacks associated therewith. For example, commonly used cathodes in electron accelerators emit not only electrons, but also conductive particles. These conductive particles may build up on insulating surfaces inside the electron accelerator, thereby changing the characteristics of those insulating surfaces. This in turn may undesirably affect the electric field inside the electron accelerator, and therefore alter the focus point of the electron beam. As a result, the electron beam may not strike the intended portion of the target. This may degrade the performance of the x-ray generator, and thus in the context of a well logging application, the performance of the well logging instrument utilizing the x-ray generator.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation generator may include an elongate generator housing having a proximal end and a distal end, a target electrode within the elongate generator housing at the distal end thereof, and a charged particle source within the elongate generator housing at the proximal end thereof to direct charged particles at the target electrode. A plurality of accelerator electrodes may be spaced apart within the elongate generator housing between the target electrode and the charged particle source to define a charged particle accelerator section. Each accelerator electrode may include an annular portion having a first opening therein, and a frustoconical portion having a base coupled to the first opening of the annular portion and having a second opening so that charged particles from the charged particle source pass through the first and second openings to reach the target electrode.

A related well logging tool including a radiation generator, such as the one described briefly above, is also provided. A related method for making a radiation generator may include positioning a target electrode within an elongate generator housing at a distal end thereof, and positioning a charged particle source within the elongate generator housing at a proximal end thereof to direct charged particles at the target electrode. The method may further include positioning a plurality of accelerator electrodes within the elongate generator housing between the target electrode and the charged particle source and spaced apart from one another to define a charged particle accelerator section. Each accelerator electrode may include an annular portion having a first opening therein, and a frustoconical portion having a base coupled to the first opening of the annular portion and having a second opening so that charged particles from the charged particle source pass through the first and second openings to reach the target electrode.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Figure 1:
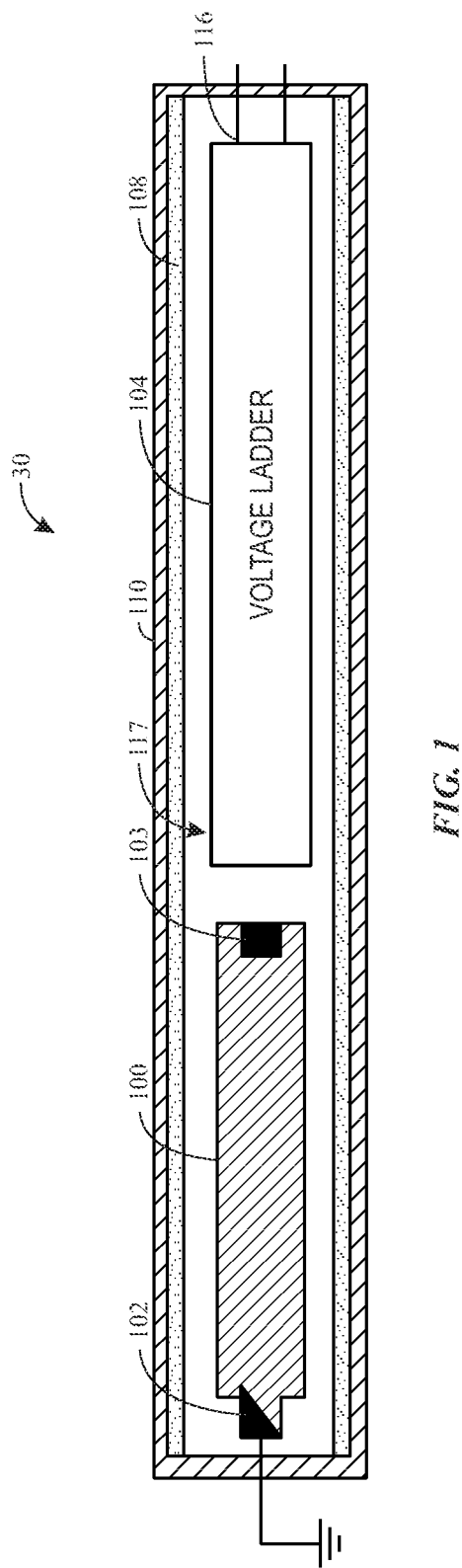
FIG. 1 is a schematic cross-sectional side view of a radiation generator in accordance with an example embodiment.

Referring initially to FIG. 1, a radiation generator system 30 is first described. In the illustrated example, the radiation generator is an x-ray generator system which includes an x-ray tube 100 that is grounded at a target (i.e., anode) 102, although floating target configurations may also be used in some embodiments. The x-ray tube 100 further illustratively includes a cathode 103 (e.g., a field emission array cathode such as a Spindt cathode, or other electron emitter cathodes)

on the opposite end of the x-ray tube 100 from the target 102. The cathode 103 is coupled to a voltage multiplication ladder 104. The x-ray tube 100 and voltage multiplication ladder 104 are enclosed within one or more insulating sleeves 108 (e.g., PFA or other high dielectric materials), which in turn is enclosed within an elongate generator housing 110.

An insulating gas may be inserted in the inner space 117 within the generator housing 110. The voltage multiplication ladder 104 further illustratively includes inputs 116 for receiving an AC voltage, e.g., on the order of several kV. The grounded target configuration shown schematically in FIG. 1 provides a simplification in the mechanical design and assembly, which may also help in maintaining mechanical stability of the target 102, maintaining thermal management of the target 102, as well as the radiation exposure of the insulating sleeve 108. The cathode 103 releases electrons in response to exposure to heat, although in some embodiments "cold" cathodes (e.g., carbon or other nanotubes, etc.) may also be used. The voltage multiplication ladder 104 applies a voltage to the cathode 103, and the introduction of current heats the cathode 103 and causes it to release electrons. Further operational details of the x-ray tube 100 will be described below.

Figure 2:
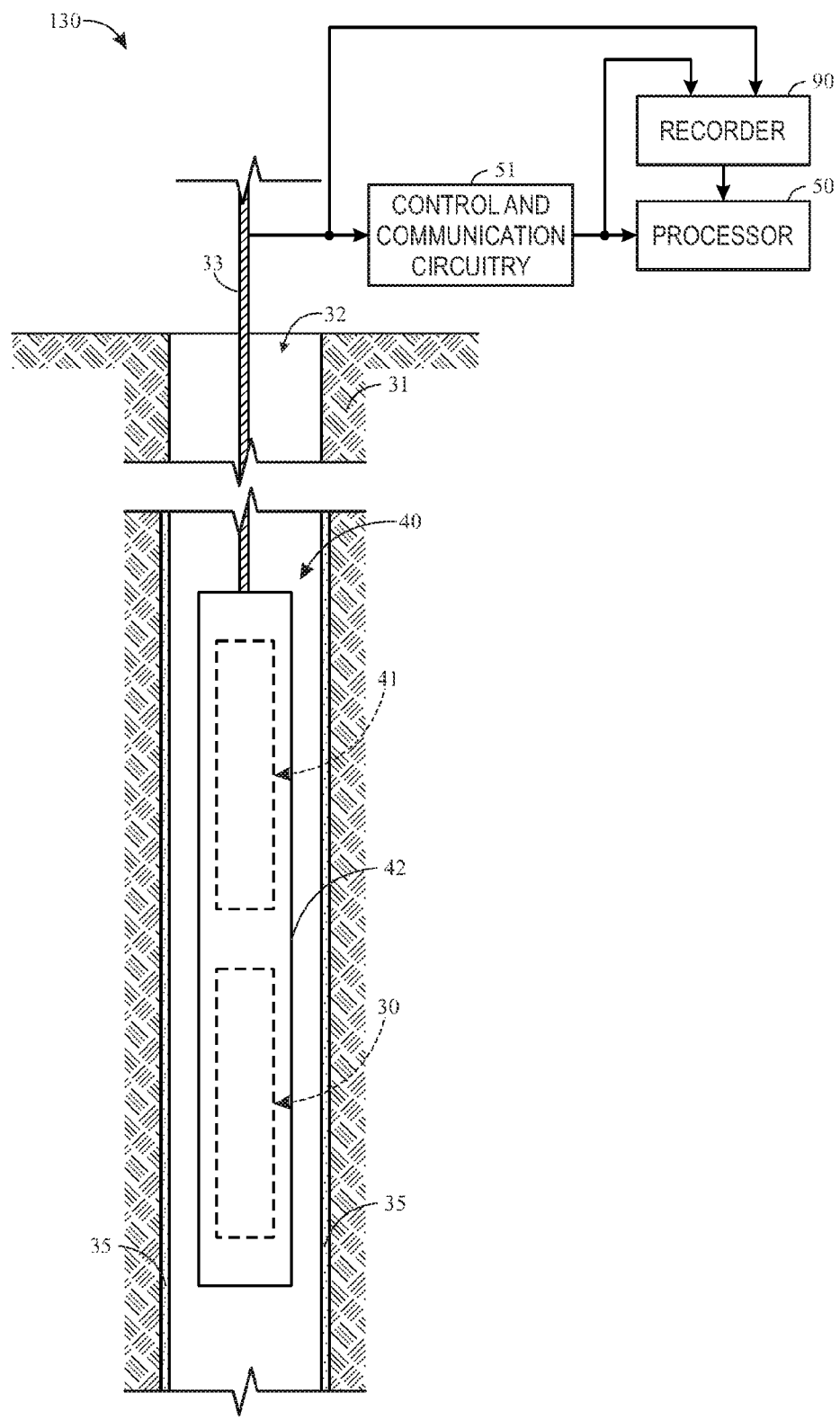
FIG. 2 is a schematic diagram, partially in block form, of a well logging apparatus including the radiation generator or FIG. 1.

Referring additionally to FIG. 2, an example well logging system 130 incorporating the radiation generator system 30 is now described. The system well logging 130 may be used for taking measurements for use in determining characteristics of formation properties, as will be discussed further below. More particularly, a borehole 32 is drilled in a formation 31 with drilling equipment, which may involve drilling fluid or mud. One or more portions of the borehole 32 may be lined with a casing 35, which may include metal (e.g., steel) cylindrical tubing, coiled tubing, cement, or a combination thereof. Other configurations may include: non-metallic casings such as fiberglass, high strength plastic, nano-material reinforced plastics, etc.; screens as used in some completions to prevent or reduce sanding; and slotted liners that may be used in completion of horizontal wells, for example.

A logging tool 40 illustratively includes a sonde housing 42 suspended in the borehole 32 on an armored multiconductor cable 33 to provide a wireline configuration, although other configurations such as logging while drilling (LWD), measurement while drilling (MWD), Slickline, coiled tubing or configurations such as logging while tripping may also be used. The length of the armored multiconductor cable 33 substantially determines the depth of the logging tool 40 within the borehole 32. A depth gauge apparatus may be provided to measure cable displacement over a sheave wheel (not shown), and thus the depth of logging tool 40 in the borehole 32.

Control and communication (e.g., telemetry) circuitry 51 is shown at the surface of the formation 31, although portions thereof may be downhole. Also, a recorder 90 is illustratively included for recording well logging data, as well as a processor 50 for processing the data. However, one or both of the recorder 90 and processor 50 may be remotely located from the well site. The processor 50 may be implemented using one or more computing devices with appropriate hardware (e.g., microprocessor, memory, etc.) and non-transitory computer-readable medium components having computer-readable instructions, as will be appreciated by those skilled in the art.

The logging tool 40 may include one or more types of logging devices that take measurements from which formation characteristics may be determined. In the illustrated example, the logging tool 40 includes the radiation (e.g., x-ray) generator system 30 and an associated detector(s) 41, although various other types of logging devices may also be used. Such devices may include resistivity, induction, and electromagnetic propagation devices, a nuclear logging device (e.g., NMR), a sonic logging device, or a fluid sampling logging device, as well as combinations of these and other devices. Devices may be combined in a tool string and/or used during separate logging runs. Also, measurements may be taken during drilling, tripping, and/or sliding. Some examples of the types of formation characteristics that may be determined using these types of devices include the following: determination, from deep three-dimensional electromagnetic measurements, of distance and direction to faults or deposits such as salt domes or hydrocarbons; determination, from acoustic shear and/or compressional wave speeds and/or wave attenuations, of formation porosity, permeability, and/or lithology; determination of formation anisotropy from electromagnetic and/or acoustic measurements; determination, from attenuation and frequency of a rod or plate vibrating in a fluid, of formation fluid viscosity and/or density; determination, from resistivity and/or NMR measurements, of formation water saturation and/or permeability; determination, from count rates of gamma rays and/or neutrons at spaced detectors, of formation porosity and/or density; and determination, from electromagnetic, acoustic and/or nuclear measurements, of formation bed thickness.

Figure 3:
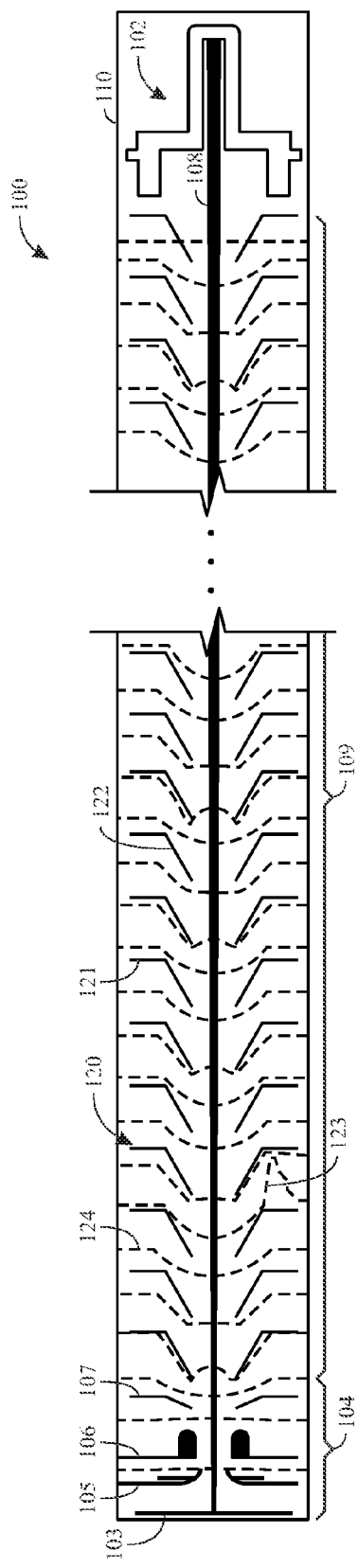
FIG. 3 is a side view of an example embodiment of the radiation generator of FIG. 1.

Referring now to FIG. 3, an example implementation of the radiation generator system 30, and more particularly the x-ray tube 100, is now described. A puller section or grid 104 illustratively includes a series of electrodes 105-107 which move electrons released from the cathode 103 toward an electron accelerating section 109. More particularly, the electrodes 105-107 functions as a series of focusing and puller electrodes which shape the electric field such that electrons are "pulled" out of the cathode 103 and focused in a beam 108 toward the target 102, as shown.

The electron accelerating section 109 illustratively includes a plurality of accelerator electrodes 120 which speed electrons toward the target 102. Upon collision with the target 102, x-rays are generated which may be used in various applications, such as downhole well logging measurements, for example.

As noted above, unsymmetrical charges in an x-ray tube 100 will cause the beam spot to move on the target 102. This beam shift may be caused by localized field emission from the triple point (i.e., the junction between the electrode metal, vacuum and an insulator surface) on the insulator surface due to imperfections, or "cleanliness" of the electrodes in the x-ray tube 100. Moreover, this may also be caused by secondary electrons which land on the insulator, as will be appreciated by those skilled in the art.

To help overcome the effects of unsymmetrical charges and/or secondary electrons, the electron accelerating section 109 illustratively includes a plurality of accelerator electrodes 120 spaced apart within the x-ray tube 100 between the target 102 and the charged particle source (i.e., cathode) 103 to define the electron accelerating section 109. Each accelerator electrode 120 illustratively includes an annular portion 121 (which faces the target 102) having a first opening therein, and a frustoconical portion 122 having a base coupled to the first opening of the annular portion 121 and having a second opening so that the beam 108 of electrons from the cathode 103 pass through the first opening and the second opening to reach the target 102, as shown. The accelerator electrodes 120 may have a potential applied thereto to help accelerate the electrons downstream to the target 102. When the electrons strike the target 102, x-rays are emitted from the target 102.

To understand the effects of an unsymmetrical charge, a simulation of the x-ray tube 100 was performed in which an unsymmetrical charge (represented by a horizontal line 123 in FIG. 3) is present between two adjacent accelerator electrodes 120. While this unsymmetrical charge 123 interrupts the individual field line 124 (shown in dashes in FIG. 3) in the area near the unsymmetrical charge 123, the field lines 124 remain symmetrical at the first openings of the adjacent accelerator electrodes 120. As such, the beam 108 is not steered up or down, and remains on the desired target spot of the target 102. By way of contrast, simulations show that a similar unsymmetrical charge 123 to the one shown in FIG. 3 for typical annular-shaped accelerator electrodes (i.e., without the frustoconical portion 122) push the beam 108 in the opposite direction, meaning that in this example the beam 108 would have been steered upward toward the top of the target 102.

Figure 5:
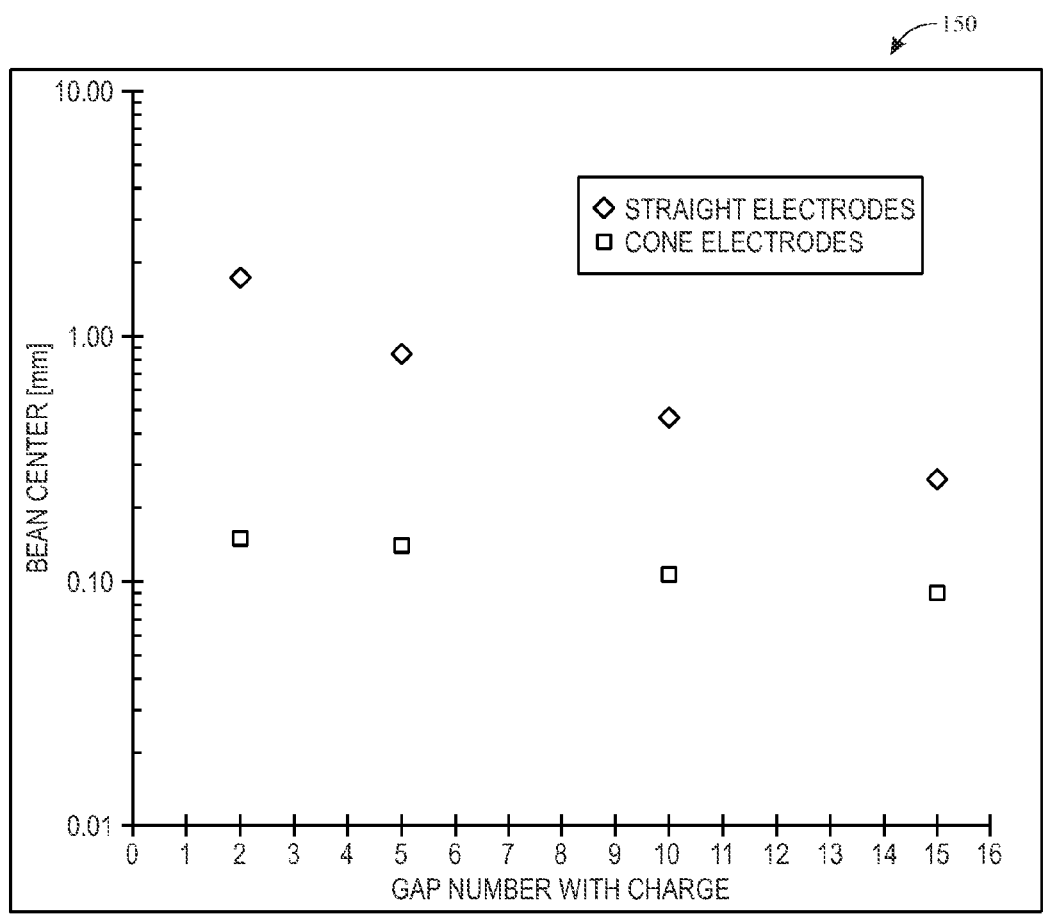
FIG. 5 is a graph showing simulated beam center location vs. the location of an accelerator electrode gap with asymmetric charge on the insulator surface for the radiation generator of FIG. 3, and for a convention radiation generator configuration.

The effect of the frustoconical electrodes 120 vs. a conventional annular (or straight) electrode will be further understood with reference to FIG. 5, in which a graph 150 shows simulation results for an x-ray tube 100 have either one or the other of these two types of electrodes. The position of the center of the beam is plotted as a function of the insulator gap number where the unsymmetrical charge 123 is present. As seen in the graph 150, the closer you are to the cathode 103 (i.e., smaller gap numbers), the greater the effect the unsymmetrical charge 123 has on the beam position. This is normal because closer to the cathode 103 the beam energy is lower, thus it is more likely to bend due to some unsymmetrical field. It will also be seen that the beam spot movement is dramatically smaller with the frustoconical electrodes 120 compared to the conventional annular electrodes.

Another benefit of the frustoconical electrodes 120 compared to the conventional annular electrodes is with respect to back streaming electrons. More particularly, there is a finite probability that some of the electrons striking the target 102 could turn back and stream back to the electron accelerating section 109. These electrons have a relatively wide energy distribution from full energy to several eV's. Conventional annular (or straight) accelerator electrodes may not adequately shield the insulator surfaces, resulting in a chance that these back streaming electrons will strike the surfaces of the insulator and create a charging up effect, which in turn could lead to beam instabilities, as noted above. Yet, the frustoconical electrodes 120 may advantageously block the path of such back streaming electrons so that they are less likely to get on the insulator surfaces.

Figure 4:
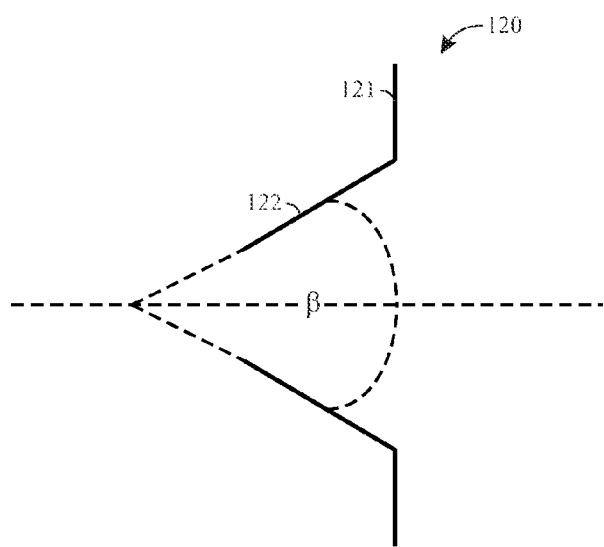
FIG. 4 is side view of an accelerator electrode of the radiation generator of FIG. 3.

To this end, an included angle β of the frustoconical portion 122 (see FIG. 4) may be in a range of 10° to 80°, for example, although other included angles may also be used. Moreover, different electrodes may have different included angles. For example, in the embodiment illustrated in FIG. 3, the electrode 107 has a frustoconical configuration with a greater included angle than those of the electrodes 120 in the electron accelerating section 109. Generally speaking, the number of electrodes used in a given configuration will follow from the dimensions of the given elongate generator housing 110 that is used. By way of example, the elongate generator housing 110 may have a diameter in a rage of about 0.5 to 2 inches, and a length of about 2 to 20 inches, depending on the drilling equipment, downhole tool equipment, etc., being used in a given implementation. Other dimensions are also possible in different embodiments.

A related method for making the x-ray tube 100 may include positioning a target 102 within the elongate generator housing 110 at a distal end thereof, and positioning a an electron source (e.g., the cathode 103) within the elongate generator housing 110 at a proximal end thereof to direct electrons at the target 102. The method may further include positioning a plurality of accelerator electrodes 120 within the elongate generator housing 110 between the target 102 and the cathode 103 and spaced apart from one another to define an electron accelerating section 109. Each accelerator electrode 120 may include an annular portion 121 having a first opening therein, and a frustoconical portion 122 having a base coupled to the first opening of the annular portion 121 and having a second opening so that electrons from the cathode 103 pass through the first and second openings to reach the target 102, as discussed further above.

Figure 6:
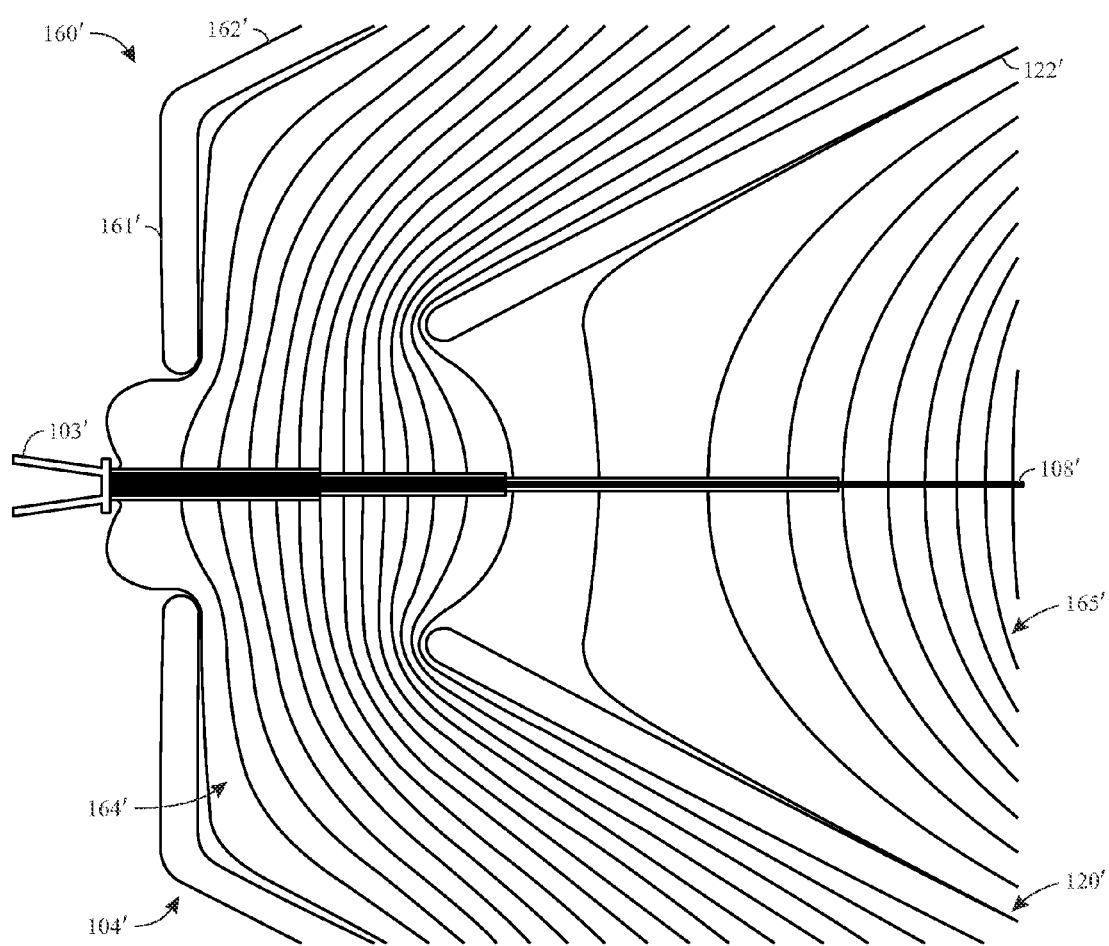
FIGS. 6 and 7 are side views of the injector configuration which may be used in an example embodiment of the radiation generator of FIG. 3.
Figure 7:
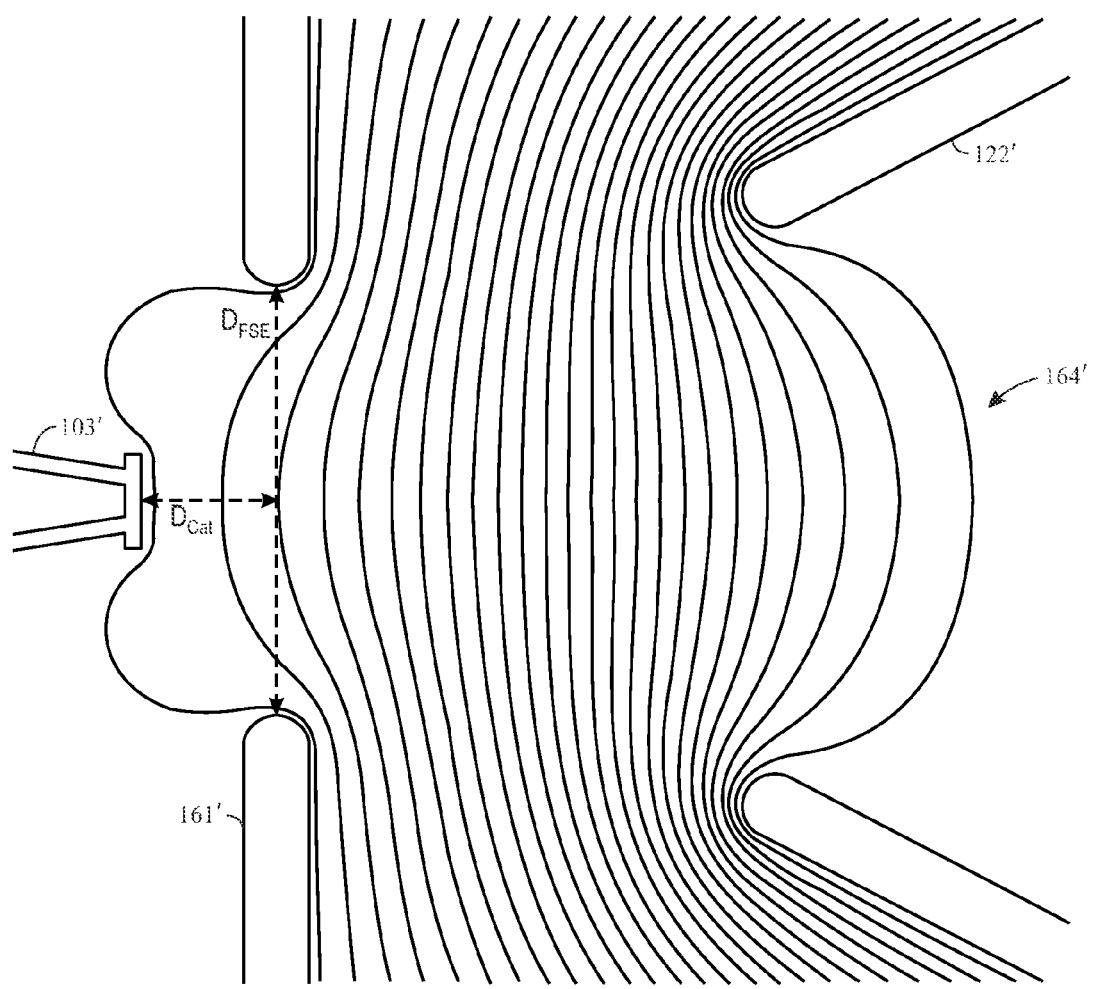
Figure 8:
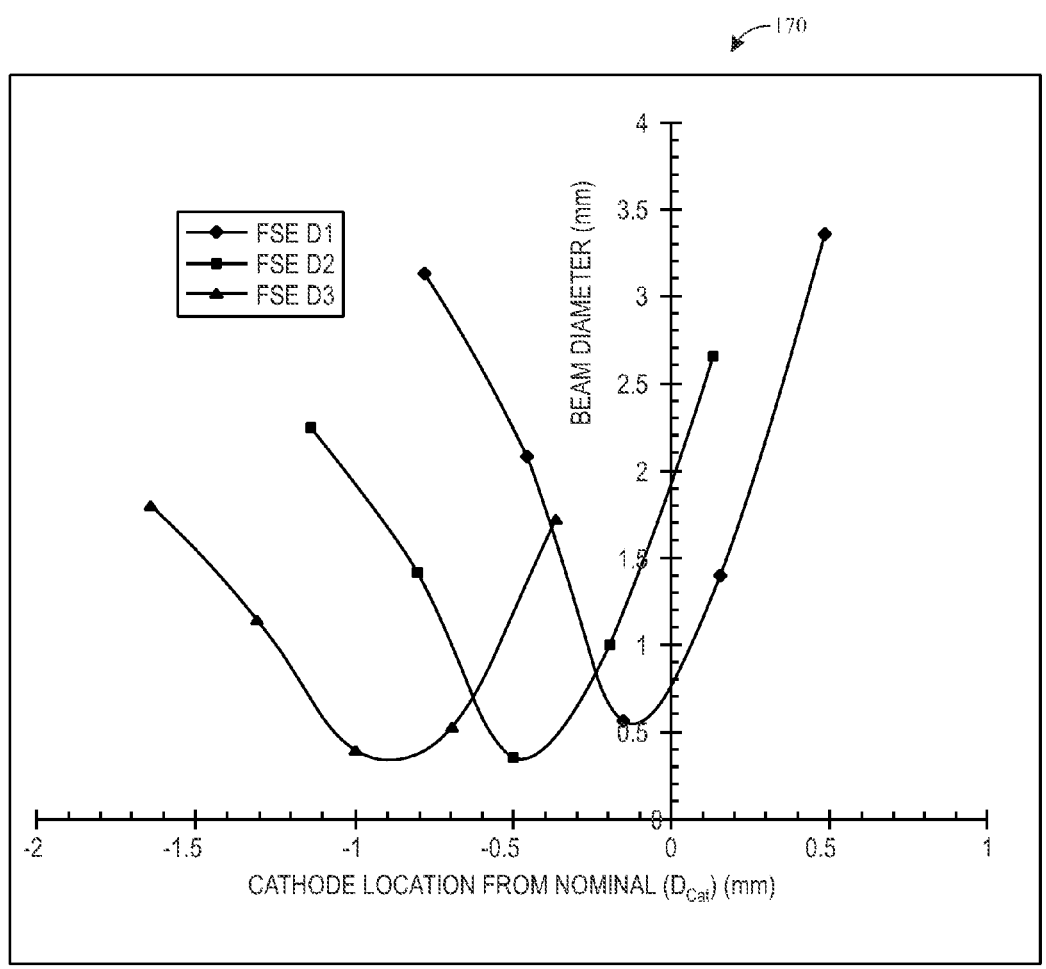
FIG. 8 is a graph of simulated beam diameter vs. cathode location with respect to the field shaping electrode of the injector configuration of FIG. 7 for various field shaping electrode opening diameters.

Turning now to FIGS. 6-8, in accordance with another example embodiment, frustoconical electrodes may also be incorporated in the injector section of an x-ray tube to create a bias-less injector. By way of background, in conventional traditional electron beam optics system, the initial beam focusing is done by Wehnelt-type optics system, which is based on negatively biasing the area next to the cathode surface. In order to extract an electron beam from the cathode, a second bias (with positive potential) is applied to a biasing electrode directly adjacent the cathode to initiate the electron extraction. The focusing is thus determined by the geometry of this two-electrode system, and the relative strengths of the negative and positive field at the cathode location.

More particularly, in the conventional configuration the biasing (i.e., Wehnelt) electrode is biased negatively compared to the cathode potential. The relative strength of this bias in comparison to the bias between the cathode and the biasing electrode determine the initial focusing of the electron beam. When the Wehnelt electrode is at high negative potential relative to the cathode, this leads to a tighter initial focusing. When the Wehnelt electrode is weakly biased against the cathode, this leads to a relatively weak (i.e., loose) focusing. This focusing is due to the electric field close to the cathode surface which is curved. If too high of a level of biasing is applied, the beam emission will stop.

As such, a potential drawback with Wehnelt-type focusing systems is the requirement of adjustable potential sources at the injector to achieve biasing of the injector electrodes in a desired manner. Another issue is the use of multiple electrodes of different polarity, i.e., one for the negative bias and another for the positive bias. This increases the complexity of the construction of the accelerator and/or makes the optics tuning time consuming if biasing is done with resistors, for example.

In the example embodiment illustrated in FIGS. 6 and 7, the puller section 104' illustratively includes a field shaping electrode 160' having an annular portion 161' with an opening therein aligned with the cathode, and a frustoconical portion 162' coupled to the perimeter of the annular portion and having its base opening directed toward the target (not shown in FIGS. 6 and 7). That is, the field shaping electrode 160' may be considered the inverse of the accelerator electrode 120', in that the annular portion of the field shaping electrode has a smaller diameter than that of the accelerator electrode, and it faces the cathode 103' rather than the target as shown.

Moreover, in the example embodiment, the field shaping electrode 161' is electrically coupled to the cathode 103'. The beam "optics" are determined by the geometry of the field shaping electrode 160' (with opening diameter $D_{FSE}$), a distance $d_{Cat}$ between the opening of the field shaping electrode and the axial position of the cathode 103', and the geometry and the potential of the first accelerator electrode 120'. As seen in FIG. 7, a focusing extraction field 164' may be adjusted by changing the diameter $D_{FSE}$ of the opening, and the axial distance $d_{Cat}$ of the cathode 103' from this opening. By way of example, for an x-ray tube for use in a well logging applications as described above, the diameter $D_{FSE}$ may be in a range of 1 mm to 20 mm, and the axial distance $d_{Cat}$ may be in a range of 1 mm to 20 mm, although other dimensions may also be used in different embodiments.

An extraction field 164' is provided through the biasing of the accelerator electrode(s) 122'. This bias may be the same as in the rest of the accelerator gaps, so that no variable or even different potentials are needed in the first acceleration gap, making the accelerator biasing system relatively less complicated to implement. That is, the beam optics are primarily defined by the values of $D_{FSE}$ and $d_{Cat}$, and not by the potential in the first acceleration gap. In this manner, the beam optics may advantageously stay the same or remain constant regardless of the operation potential of the acceleration tube.

The graph 170 of FIG. 8 plots the diameter of the beam 108' at the target as a function of axial position or distance $d_{Cat}$ with three different values (D1-D3) of the opening diameter $D_{FSE}$, namely 1.3 mm for D1, 1.7 mm for D2, and 2.1 mm for D3 (all dimensions in the graph 170 are in mm). It may be seen that there is an optimum axial location distance $d_{Cat}$ of the cathode 103' relative to the field shaping electrode 161' which may be selected for each opening diameter $D_{FSE}$. Thus, by locating the cathode 103' at an optimum distance $d_{Cat}$ from the opening given the opening diameter $D_{FSE}$, the beam optics stay constant regardless of the operation potential.

A related method is for making a radiation generator incorporating the unbiased or electrically floating field shaping electrode 161'. The method may include positioning a target electrode (similar to target electrode 102 in FIG. 3) within an elongate generator housing (similar to the housing 110 in FIG. 3) at the distal end thereof, and positioning a charged particle source (e.g., the cathode 103') within the elongate generator housing at a proximal end thereof to direct charged particles at the target electrode based upon a first biasing potential, and positioning a field shaping electrode 160' within the elongate generator housing and adjacent the charged particle source to shape a field within the elongate generator housing. The method may further include positioning at least one accelerator electrode 122' within the housing on an opposite side of the field shaping electrode 161' from the charged particle source to accelerate charged particles from the cathode 103' to the target electrode based upon a second biasing potential different than the first biasing potential. The field shaping electrode 161' may be electrically coupled or connected to the cathode so that the charged particles are directed from the cathode 103' to the target electrode without applying a biasing potential to the field shaping electrode that is different from that of the cathode.

It should be noted that, while the above-described radiation generator embodiments were presented with respect to x-ray tubes (i.e., electron stream generators) for well logging applications, radiation generators incorporating the above configurations may be used for other applications as well, as will be appreciated by those skilled in the art. Moreover, in some embodiments, an ion stream generator may be used, as opposed to an electron stream generator, as will also be appreciated by those skilled in the art.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A radiation generator comprising:
   an elongate generator housing having a proximal end and a distal end;
   a target electrode within the elongate generator housing at the distal end thereof;
   a charged particle source within the elongate generator housing at the proximal end thereof to direct charged particles at said target electrode; and
   a plurality of accelerator electrodes spaced apart within the elongate generator housing between the target electrode and the charged particle source to define a charged particle accelerator section, each accelerator electrode comprising
   an annular portion having a first opening therein, and
   a frustoconical portion having a base coupled to the first opening of the annular portion and having a second opening so that charged particles from the charged particle source pass through the first opening and the second opening to reach the target electrode.

2. The radiation generator of claim 1, wherein said frustoconical portion comprises an included angle in a range of 10° to 80°.

3. The radiation generator of claim 1, wherein the plurality of accelerator electrodes comprise a first accelerator electrode and a second accelerator electrode, wherein the first accelerator electrode having a respective frustoconical portion with a first included angle, and wherein the second accelerator electrode having a respective frustoconical portion with a second included angle different from the first included angle.

4. The radiation generator of claim 1, wherein said annular portions of said plurality of accelerator electrodes face said target electrode.

5. The radiation generator of claim 1, wherein said charged particle source comprises an electron stream generator.

6. The radiation generator of claim 1, wherein said charged particle source comprises an ion stream generator.

7. The radiation generator of claim 1, further comprising an insulator carried along a sidewall of said elongate generator housing.

8. A well logging tool comprising:
   a sonde housing;
   at least one radiation detector carried by said sonde housing; and
   a radiation generator carried by said sonde housing and comprising:
   an elongate generator housing having a proximal end and a distal end,
   a target electrode within the elongate generator housing at the distal end thereof,
   a charged particle source within the elongate generator housing at the proximal end thereof to direct charged particles at said target electrode, and
   a plurality of accelerator electrodes spaced apart within the elongate generator housing between the target electrode and the charged particle source to define a charged particle accelerator section, each accelerator electrode comprising:
an annular portion having a first opening therein, and
a frustoconical portion having a base coupled to the first opening of the annular portion and having a second opening so that charged particles from the charged particle source pass through the first opening and the second opening to reach the target electrode.

9. The well logging tool of claim 8, wherein said frustoconical portion comprises an included angle in a range of 10° to 80°.

10. The well logging tool of claim 8, wherein the plurality of accelerator electrodes comprise a first accelerator electrode and a second accelerator electrode, wherein the first accelerator electrode having a respective frustoconical portion with a first included angle, and wherein the second accelerator electrode having a respective frustoconical portion with a second included angle different from the first include angle.

11. The well logging tool of claim 8, wherein said annular portions of said plurality of accelerator electrodes face said target electrode.

12. The well logging tool of claim 8, wherein said charged particle source comprises an electron stream generator.

13. The well logging tool of claim 8, wherein said charged particle source comprises an ion stream generator.

14. The well logging tool of claim 8, further comprising an insulator carried along a sidewall of said elongate generator housing.

15. A method for making a radiation generator comprising:
positioning a target electrode within an elongate generator housing at a distal end thereof;
and positioning a charged particle source within the elongate generator housing at a proximal end thereof to direct charged particles at the target electrode; and
positioning a plurality of accelerator electrodes within the elongate generator housing between the target electrode and the charged particle source and spaced apart from one another to define a charged particle accelerator section, each accelerator electrode comprising:
an annular portion having a first opening therein, and
a frustoconical portion having a base coupled to the first opening of the annular portion and having a second opening so that charged particles from the charged particle source pass through the first opening and the second opening to reach the target electrode.

16. The method of claim 15, wherein the frustoconical portion comprises an included angle in a range of 10° to 80°.

17. The method of claim 15, wherein the plurality of accelerator electrodes comprise a first accelerator electrode and a second accelerator electrode, wherein the first accelerator electrode having a respective frustoconical portion with a first included angle, and wherein the second accelerator electrode having a respective frustoconical portion with a second included angle different from the first include angle.

18. The method of claim 15, wherein the annular portions of the plurality of electrodes face the target electrode.

19. The method of claim 15, wherein the charged particle source comprises an electron stream generator.

20. The method of claim 15, wherein the charged particle source comprises an ion stream generator.

* * * * *